US011397587B2

(12) United States Patent
Quinn et al.

(10) Patent No.: US 11,397,587 B2
(45) Date of Patent: Jul. 26, 2022

(54) PROCESSOR CORE ISOLATION FOR EXECUTION OF MULTIPLE OPERATING SYSTEMS ON A MULTICORE COMPUTER SYSTEM

(71) Applicant: Assured Information Security, Inc., Rome, NY (US)

(72) Inventors: Rian Quinn, Highlands Ranch, CO (US); Connor James Davis, Denver, CO (US); Harlan Philip White, Clinton, NY (US); Erin Grace Riley Hensel, Boulder, CO (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 211 days.

(21) Appl. No.: 16/377,579

(22) Filed: Apr. 8, 2019

(65) Prior Publication Data

US 2020/0319892 A1 Oct. 8, 2020

(51) Int. Cl.
*G06F 9/4401* (2018.01)
*G06F 9/455* (2018.01)

(52) U.S. Cl.
CPC .......... *G06F 9/441* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 8,615,766 | B2 * | 12/2013 | Gounares | G06F 9/45558 718/104 |
| 9,146,760 | B2 * | 9/2015 | Powell | G06F 9/4401 |
| 9,804,897 | B2 * | 10/2017 | Song | G06F 9/45558 |
| 2007/0005946 | A1 * | 1/2007 | Zimmer | H04L 69/32 713/1 |
| 2007/0022258 | A1 | 1/2007 | Panabaker et al. | |

(Continued)

OTHER PUBLICATIONS

"Tuning Xen for Performance", retrieved on Mar. 20, 2019 from the Internet URL: <https://wiki.xenproject.org/wiki/Tuning_Xen_for_Performance#vCPU_Pinning_for_guests>, 2015, 7 pgs.

(Continued)

*Primary Examiner* — Fahmida Rahman
(74) *Attorney, Agent, or Firm* — Matthew M. Hulihan; Heslin Rothenberg Farley & Mesiti PC

(57) ABSTRACT

Process core isolation for execution of multiple operating systems on a multicore computer system includes booting first and second operating systems (OSs) on a computer system that includes a plurality of processor cores across physical central processing unit(s) (CPUs). Booting the first OS boots the first OS on a first subset of the processor cores. Booting the second OS, different from the first OS, boots the second OS on a second subset of the processor cores. The first and second subsets are mutually exclusive, where a first processor core of a physical CPU of the physical CPUs is included in the first subset and a second processor core of the physical CPU is included in the second subset, and where the first and second OSs execute concurrently on the computer system, and each of the first and second OS executes on only its respective subset of processor core(s).

21 Claims, 5 Drawing Sheets

(56) References Cited

U.S. PATENT DOCUMENTS

| | | | | |
|---|---|---|---|---|
| 2009/0228656 | A1 | 9/2009 | Borkenhagen | |
| 2011/0099550 | A1 | 4/2011 | Shafi | |
| 2012/0023309 | A1* | 1/2012 | Abraham | G06F 11/2017 712/30 |
| 2012/0159144 | A1 | 6/2012 | Sengupta et al. | |
| 2012/0227040 | A1* | 9/2012 | Gounares | G06F 9/45558 718/1 |
| 2016/0378545 | A1 | 12/2016 | Ho | |
| 2018/0285135 | A1* | 10/2018 | Oks | G06F 9/485 |

OTHER PUBLICATIONS

Smith, R., "Programming for EFI: Creating a "Hello, World" Program", retrieved on Mar. 20, 2019 from the Internet URL: <https://www.rodsbooks.com/efi-programming/hello.html>, 2013, 6 pgs.

"Can I dedicate a cpu core (or cores) only for dom0?", Xen Common Problems, p. 10. Retrieved on Apr. 8, 2019 from the Internet URL: <https://wiki.xenproject.org/wiki/Xen_Common_Problems#Can_I_dedicate_a_cpu_core_.28or_cores.29_only_for_dom0.3F>, 16 pgs.

Pattnaik et al., "Scheduling techniques for GPU architectures with processing-in-memory capabilities", Proceedings of the 2016 International Conference on Parallel Architectures and Compilation. Sep. 15, 2016, retrieved from URL: <https://dLacm.org/doi/pdf/10.1145/2967938.2967940>, pp. 31-44.

International Search Report and Written Opinion for PCT/US2020/027192 completed Jun. 26, 2020, 33 pgs.

* cited by examiner

PROCESSOR CORE ISOLATION FOR EXECUTION OF MULTIPLE OPERATING SYSTEMS ON A MULTICORE COMPUTER SYSTEM

BACKGROUND

In multicore computer systems, there are one or more physical processors (referred to interchangeably herein as central processing units or CPUs) and two or more processor cores distributed across those processor(s). Many modern CPUs have multiple cores on a single CPU, and a computer system can house multiple such CPUs. Individual processor cores look like independent CPUs from the point of view of software, for instance the operating system.

It is common that a computer system boots a single, target operating system (OS) that starts-up on and takes control of each of the cores across the CPU(s) of the system, then continues execution, leveraging each core as needed. Most OSs run multiple tasks, and part of the OS's responsibility is to schedule and provide the CPU resources to the applications and other running software tasks to execute on the hardware.

SUMMARY

Current technology lacks the ability to run more than one OS on a multicore system, in which different OSs are dedicated different, specific cores on a common physical CPU. It is desired for distinct, concurrently executing OSs to have unscheduled control of their respective cores of the system, but conventional approaches on modern CPUs fail to address this situation.

Shortcomings of the prior art are overcome and additional advantages are provided through the provision of a computer-implemented method. The method includes booting a first operating system on a computer system, the computer system comprising a plurality of processor cores across one or more physical central processing units (CPUs) of the computer system, wherein booting the first operating system boots the first operating system on a first subset of the plurality of processor cores, the first subset comprising one or more processor cores; and booting a second operating system, different from the first operating system, on a second subset of the plurality of processor cores, the second subset comprising one or more processor cores, wherein the first subset and second subset are mutually exclusive subsets of the plurality of processor cores, wherein a first processor core of a physical CPU of the one or more physical CPUs is included in the first subset and a second processor core of the physical CPU is included in the second subset, and wherein the first and second operating systems execute concurrently on the computer system, and each of the first and second operating systems executes on only its respective subset of processor core(s).

A computer program product and computer system are also provided to perform methods such as the aforementioned method. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for providing separation of cores of single multicore CPUs (processors) in a computer system for execution of individual operating systems in dedicated, isolated environments. This enables functioning of multicore CPUs as if each core of the CPU was an independent CPU of the computer system, without overlap in assigned resources. The effect is to mimic a single physical computer system being physically separated into two or more different, fully functioning physical computer systems for execution of desired distinct operating systems. Aspects leverage a hypervisor as described herein, however the hypervisor provides little to no interaction and execution, on an ongoing basis, when the OSs execute on the computer system. In some embodiments, a hypervisor is started on each core and then ceases execution for the duration of a target OSs execution and uptime of the computer system.

Figure 1:
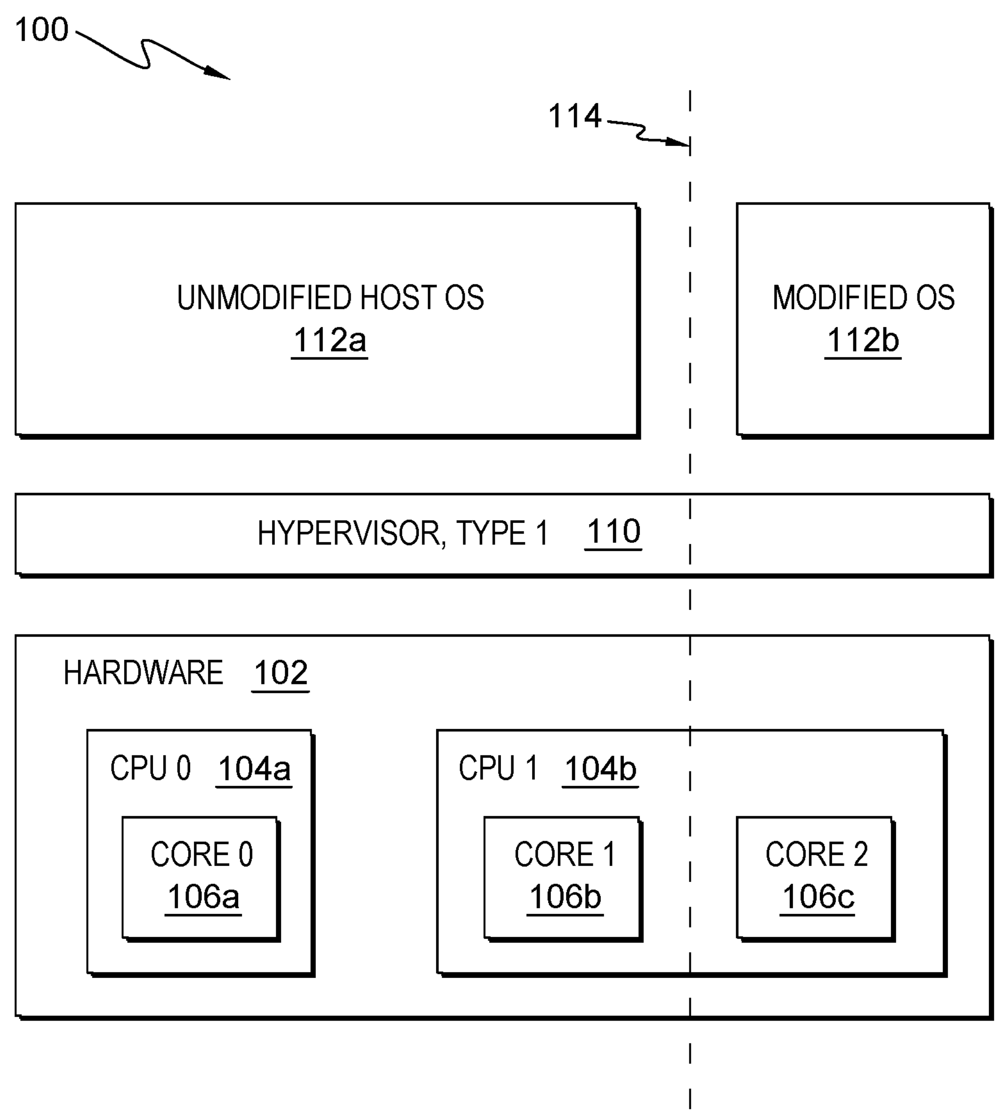
FIG. 1 depicts a conceptual system diagram of a computer system and partitioning thereof in accordance with aspects described herein.

As noted, it is desired for distinct, concurrently executing OSs to have control of their respective cores of the system. In other words, it is desired to have an ability to run more than one OS on a single computer system by taking a collection of processor cores distributed across one or more multicore CPUs and dedicating any arbitrary desired first subset of those cores to one OS, a next subset of cores to a second OS, and so on, where each such subset is mutually exclusive of all other subsets, there are no constraints on partitioning cores on a common CPU into different subsets, and core usage is unscheduled by a hypervisor on an ongoing basis. One OS will have control of some of the cores and another OS will have control of other cores, for instance to run dedicated software. This is conceptually depicted in FIG. 1. Computer system 100 includes the hardware 102 of the computer system. Depicted in FIG. 1 is only the processor hardware—other hardware such as memory, busses, I/O devices, etc. also exist but are not shown in FIG. 1. The processor hardware includes two CPUs—CPU0 (104*a*) and CPU1 (104*b*). CPU0 (104*a*) has one core, core0 (106*a*), and CPU1 (104*b*) has two cores, core1 (106*b*) and core2 (106*c*). A type-1 hypervisor 110 executes, at least temporarily, on the hardware 100, and operating systems 112*a*, 112*b* execute over the hypervisor 110. Dashed line 114 represents partitioning of the system, in which an unmodified host OS 112*a* is dedicated core0 of CPU0 and core1 of CPU1, and a modified (in this example, by way of example only) OS 112*b* is dedicated core2 of CPU1. Despite core1 and core2 being cores of CPU1, they are dedicated to different operating systems, meaning they execute different operating systems absent scheduled OS access to them. No conventional approaches provide a practical solution to achieve this.

As described in further detail herein, a hypervisor is booted on each core to take control thereof. After some initialization and setup to partition the system, a respective target OS for each partition is booted on the cores assigned to that partition and uses the hardware dedicated to that partition. From that point, the hypervisor no longer runs on the cores, except in only limited, defined cases, as necessary. Notably, not only are multiple OSs running on the system, each with dedicated resources that are not shared, but there is no scheduler (e.g. of any hypervisor above which the OSs execute) executing on the system, and, in some embodiments, the hypervisor never (unless/until the computer system is rebooted) executes after the OSs are booted on their dedicated cores.

Hardware other than the cores can also be dedicated as part of the partition initialization. Taking system memory for instance, the hypervisor can tell each core what system memory (random access memory) exists for that core/partition. The other OSs executing on cores of other partitions can operate without knowledge that there is that other memory in the system and without knowledge of any other executing OSs on the computer system. Virtualization extensions are one tool that can be leveraged. They may be leveraged for interrupt direction, and leveraged to create page tables dedicating distinct portions of memory to different OSs, as examples.

Control flow that is provided in conjunction with the well-known Unified Extensible Firmware Interface (UEFI), which grew out of the Extensible Firmware Interface (EFI), is leveraged to achieve aspects described herein. UEFI and EFI are used interchangeably herein, referring to the software interface between platform (hardware) firmware and the OSs of the system. UEFI includes a set of common application programming interfaces (APIs).

EFI applications are custom software that are typically run prior to booting a host OS. A custom EFI application termed "Firestreak" herein operates in accordance with aspects described herein to perform actions. Firestreak is started on a first core (referred to as the bootstrap processor or BSP), coordinates the startup of the other cores of the system (referred to as application processors or APs), and also initializes the execution of software on those other cores. From a high level, UEFI APIs are leveraged to start a custom hypervisor on each core. Once the hypervisor is running on each core, it dictates which OS is started (bootstrapped) on each core. Typically, though not in every embodiment, one of the OSs to run on the computer system will be considered a host OS for native execution on the system and other OS(s) will be modified or custom OSs configured with some level of hypervisor awareness, e.g. to invoke hypervisor calls where necessary. The hypervisor and/or custom EFI application Firestreak allocates the core(s) and memory (and possibly other physical resources) dedicated to the host OS and its partition. It also allocates the core(s) and memory (and possibly other physical resources) dedicated to any other OSs on the system, e.g. custom or modified OSs, and their respective partitions.

In a particular example, the host OS is an out-of-box unmodified OS such as a Windows® operating system offered by Microsoft Corporation, Redmond, Wash., U.S.A. (of which WINDOWS is a registered trademark). Unmodified OSs can run "native" on the platform, in that legacy structures (BIOS for instance) are what the OS expects to see. They can use traditional, native ways of acquiring information on the system. Custom/Modified OS(s) are "modified", for instance compiled with certain instructions/functions, to make it hypervisor aware and tailored to avoid attempting to perform activity that would otherwise cause incompatibilities with the separation that is setup by Firestreak. One example is to avoid 'taking over' the computer system's BIOS (Basic Input/Output System). For instance, each modified OS may be configured not to attempt a takeover of BIOS or perform any other activity that the computer system was designed to perform only once, since those activities may be left to the host OS only. It is noted, however, that in other embodiments, the OSs are all unmodified (out-of-the box) OSs. In other words, aspects described herein apply to situations in which no OS modifications are required and all OSs are unmodified. Modified guests may be configured/modified to use given hypervisor-aware instructions as an alternative to a traditional, native way of acquiring information on the system. By way of specific example, any OS made for PC (Intel®-based) platforms is to acquire a memory map of the system. The native way of doing this is to call into the BIOS with a specific BIOS interrupt call, e.g. the 'int 15' instruction. A modified, hypervisor-aware guest, such as a modified Linux-based guest, could be configured to acquire the memory map by using a hypervisor-provided instruction, e.g. the 'vmcall' instruction. Thus, the unmodified operating system may be configured to execute natively on the computer system, invoking instructions calling to computer system firmware to acquire system information, and the modified operating system(s) may be configured to execute with awareness of the hypervisor, invoking instructions calling to the hypervisor to acquire system information.

An isolation of the cores is provided. Hardware virtualization extensions can be leveraged to trick each OS into running on only specific, dedicated processor core(s). In arrangements, the hypervisor itself does not execute unless certain defined situations (termed edge cases below) are encountered and thereby the OSs avoid traditional 'guest' status that is scheduled by the hypervisor when the OSs execute.

One effect of partitioning as described herein is that two (or more) OSs can execute at the same time (contemporaneously, concurrently, simultaneously) on respective cores of a single CPU without involvement of a scheduler to schedule that execution. Conventionally, a hypervisor scheduler is used to schedule which OS is entitled to use which system resources at given times. Every conventional hypervisor includes a scheduler that is conventionally used and executed during guest execution. In contrast, aspects described herein can involve no such scheduler on account that there are no shared resources that are to be scheduled for use. Instead, discrete resources are dedicated to a respective OS. In embodiments, a point of the partitioning as described herein is to eliminate the need for a scheduler in the hypervisor, i.e. meaning the activity to schedule the OSs' use of, e.g., the core(s). Instead, each OS to execute on the system is dedicated a respective subset of (i.e. that includes) one or more cores, the subsets are mutually exclusive with no overlap in cores, the OS executes on only that subset of core(s), and no other OS is allowed to, and does not, execute on any core(s) in that subset. Neither does any OS touch any resource it has not been dedicated (memory, I/O, core, etc.). Notably, each OS can be given what it needs to satisfactorily perform its activity—just the right amount of memory, cache, cores, devices if it needs them, assigned I/O ports, etc. The hypervisor can orchestrate all of that at/before boot time. For graphics output, there could be physically separate graphics cards, though practically speaking it may be that the modified OS(s) focuses on execution of background processes, thus not requiring display capability.

Figure 2:
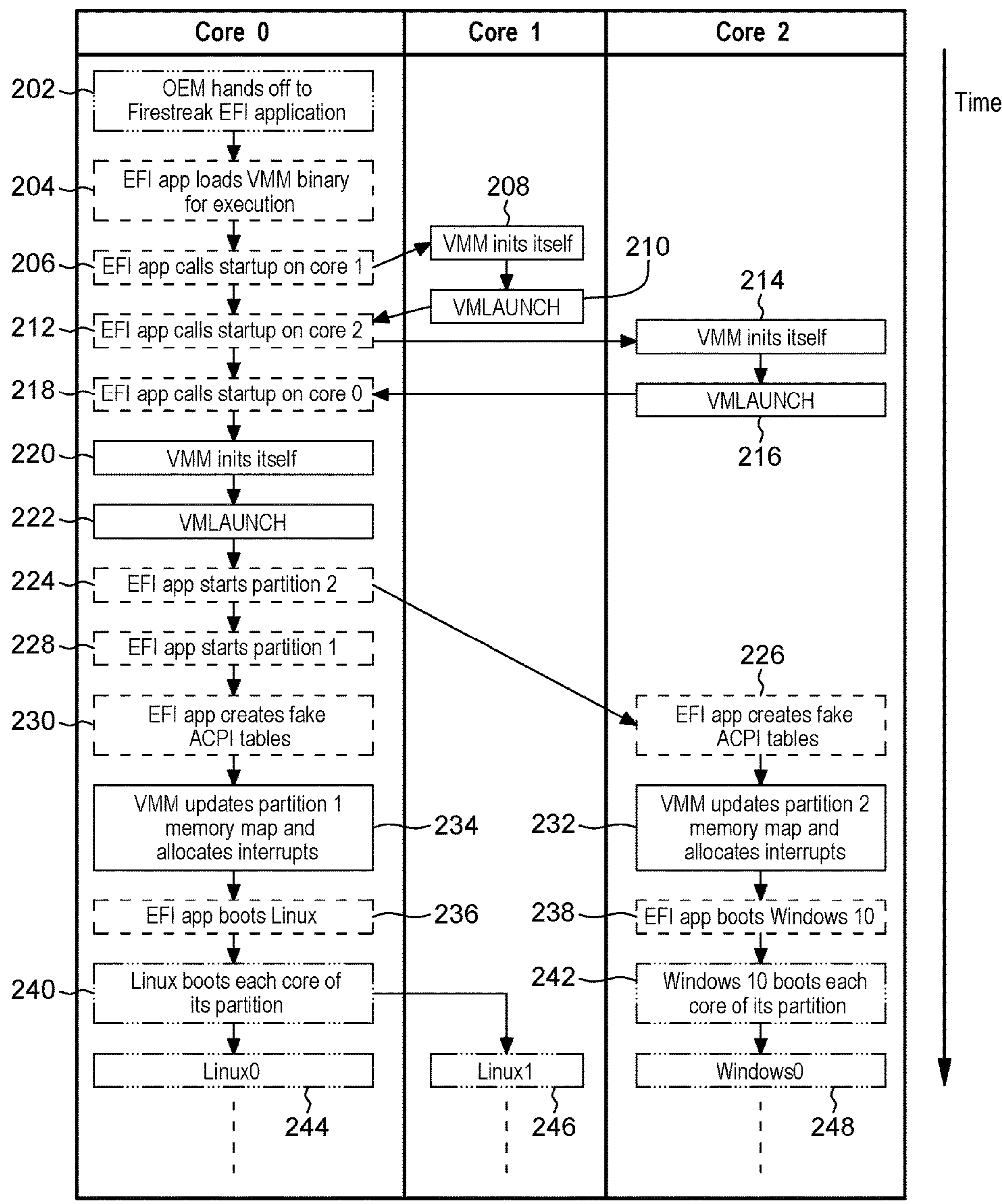
FIG. 2 depicts a flow of a boot process to boot multiple operating systems on separate partitions with dedicated cores of a multicore computer system in accordance with aspects described herein.

A detailed embodiment is now presented with reference to FIG. 2, depicting a flow of a boot process to boot multiple operating systems on separate partitions with dedicated cores of a multicore computer system in accordance with aspects described herein. FIG. 2 depicts actions on the three cores of an example system to setup two partitions—partition 1 having cores 0 and 1 to run a Linux operating system ('Linux0' 244 on core 0 and 'linux1' 246 on core 1) and partition 2 having core 2 to run a Windows® OS ('Windows0' 248). The cores exist on any one or more CPUs. In specific examples, cores on a common (single) CPU are part of different partitions. Thus, in the example of FIG. 1, core 0 is on a first CPU and cores 1 and 2 are on a second CPU. In another example, all three cores are on a single CPU.

Control flow is obtained from EFI via standard means. When the power of the computer system is turned on, the EFI firmware, typically written by the system Original Equipment Manufacturer (OEM) and executing on one core (e.g. core 0), brings the platform to an initial state capable of running programs out of 'memory'. Since system memory (RAM) itself is not yet available at the very beginning of the boot process, code uses CPU cache(s) as the 'memory' until the memory controller is initialized. After this early initialization, the OEM-provided EFI firmware ('external' code) hands-off (202) control to the Firestreak EFI application (also referred to herein as the Firestreak driver). EFI firmware hands-off to a first entry in a "BootOrder" variable, which is part of the UEFI specification. Any system that properly implements UEFI includes this variable. The BootOrder variable typically contains a list of file paths, each of which points to an 'EFI application'. Firestreak is an example EFI application. In a typical/conventional Windows® system, the EFI application will have been written by Microsoft and will perform further initialization before handing control to the Windows® OS.

In order to gain this handoff from the EFI firmware, the BootOrder variable can be modified to point to the Firestreak EFI application prior to this execution flow of FIG. 2. In some examples, Firestreak is in the Portable Executable format, which is a standard executable format for EFI environments. Mutability of the BootOrder variable is mandated by the EFI specification, and modification of the BootOrder variable to point to a custom EFI app (e.g. Firestreak) can be made by any of various approaches. In one approach, the variable is changed after booting into an OS such as Linux and using a userspace application to adjust the variable. Alternatively, for instance if there is no OS already installed on the system, the variable is changed from UEFI itself using a UEFI shell. Such a shell typically requires putting an EFI application on the system without booting into the system, for instance by way of physical access and transfer of the EFI binary to the system. Booting into a shell can allow a user or program to modify EFI variables such as the BootOrder variable.

In any case, once the Firestreak EFI application is handed control (202) from the OEM firmware, it performs tasks to complete an overall task of booting "targets". Typically, each such target will be an operating system like Windows® or Linux, though it could be any desired code. From a flow control perspective, the executing Firestreak EFI application can use API(s) mandated by the UEFI specification to manipulate the BootOrder variable. In addition to BootOrder, a BootNext variable can be used to direct flow, for instance to point to target OSs. BootOrder is typically a static list that EFI uses when the BootNext variable is not set; the BootOrder sequence can be trumped by the BootNext variable if set. If not set, UEFI flow proceeds in the sequence of the BootOrder list.

It is again noted that standard EFI firmware hands-off to the next target in the BootOrder variable (in this example the Firestreak app) with only one core running. The task of bringing up the other cores is delegated to that target. Thus, the Firestreak app executes initially on only one core—in this example core 0. However, in order to gain full control of the platform, a hypervisor is booted/loaded on every core. A task of Firestreak is therefore to load and start a hypervisor on each of the 'dormant' core(s) and on the core on which Firestreak runs when handed control. Most EFI implementations implement the MP ("multiprocessing") protocol. Thus, a function in EFI allows assigning code to run on a different core than the core invoking the function, the function being the 'StartupThisAP' function. In this example, the function is used to setup processor (core) state so that the hypervisor can run.

However, before invoking StartupThisAP to load and run the hypervisor, the hypervisor code is to be loaded into system memory (e.g. RAM). To this end, in particular embodiments the toolchain to build Firestreak can embed, using known technology, the image of the hypervisor (e.g. in ELF—Executable and Linkable Format—a common file format) into the Firestreak EFI application at link time. The embedding of the hypervisor code into the Firestreak application enables a loader of the application to access the hypervisor code image as a single, contiguous array of bytes. This EFI loader can then feed this array to an ELF loader that performs relocations and provides the entry point (i.e. the address of the first instruction) to run the hypervisor. An ELF loader of the Firestreak EFI application extracts/loads (204) the hypervisor (also referred to as VMM or Virtual Machine Monitor herein) code out into system memory so that the hypervisor can be run.

After the VMM extraction (204) of FIG. 2, the hypervisor code is in system memory and the hypervisor can be initialized ("init") on each of the cores. Each core is to run its own instance of the hypervisor, at least to perform platform-resource setup before handing over to a target OS. Core startup is performed sequentially in FIG. 2, and proceeds through all cores, ending with the core (core 0) running Firestreak. The Firestreak EFI app calls startup on each core by calling into the hypervisor code using the StartupThisAp function. Thus, Firestreak calls startup on core 1 (206), which dictates that core 1 begin by executing a function that bootstraps the hypervisor on core 1 to init the VMM on the core. The core performs that bootstrapping using the VMM code previously placed into memory. Flow proceeds from 206 to execution on core 1 where the VMM inits itself (208). After the init, the core returns to the Firestreak EFI App by issuing a function to launch a virtual machine (VM). The VMLAUNCH instruction (210) is used in the example of FIG. 2, but the particular instruction used will depend on the actual computer system architecture of the system.

This startup is repeated for the remaining cores. The EFI app calls startup on core 2 (212) which directs flow to processing on core 2 where the VMM inits itself (214) and issues the VMLAUNCH instruction (216). It is noted that the VMM init can be performed on each core from the single copy of the VMM code that was loaded out to system memory.

In FIG. 2, the legend indicates that the Firestreak EFI app executes in 'ring 0' while the VMM executes in 'ring −1'. 'Rings' are security/protection rings present in Intel®-based system architectures (INTEL is a registered trademark of Intel Corporation, Santa Clara, Calif., USA). Operating systems typically run in ring 0, the VMM or hypervisor runs in ring −1, and userland applications run in ring 3. Before the VMLAUNCH, the hypervisor is technically not yet running in ring −1 in the sense that it is not yet executing at a privileged level. When the EFI app runs initially, it is running in ring 0. The hypervisor is loaded into memory and, when called to init, it is also running in ring 0. Virtualization has not yet been enabled because setup has yet to be performed to enable ring −1. Upon execution of the VMLAUNCH, that will place the VMM code under the target code loaded on the core.

The VMM init on each core includes bootstrapping the hypervisor. As part of this, a call can be made to the target processor core prompting it to execute some of the Firestreak EFI application code at a specific address. The Firestreak EFI application code at that address is executed by the called core to perform hypervisor init procedures, for instance mapping memory into the hypervisor for memory allocation and setting up data structures (e.g. Virtual Machine Control Structures—VMCS, Extended Page Tables—EPTs, etc.) used in virtualization. As part of this, page tables are created by indicating to EFI the desired memory and then making the memory available to the hypervisor by configuring known structures in hardware. In general, these actions are to set up the core state so that the hypervisor can start. Virtualization becomes enabled at the end of this setup to enable access to the above those structures. Once this setup is complete, the hypervisor code exits by calling the VMLAUNCH instruction and handing control back to core 0. The VMLAUNCH instruction is where the hardware looks into the VMCS and follows an instruction pointer placed there by the hypervisor. The VMLAUNCH causes control to pass back to the core 0, specifically at a target instruction in the Firestreak app on core 0. Flow moves back to core 0 from the core on which StartupThisAp was invoked with this core running with 'ring 0' privileges as a 'guest' over the hypervisor now executing with ring −1 privileges.

After repeating this to init the VMM on core 2, flow returns to core 0. At this point, core 0 inits the VMM on itself by calling (218) startup on core 0. The VMM inits itself (220) and issues the VMLAUNCH instruction (222), again causing control to pass back to the Firestreak EFI application.

From here, the desired partitions can be started to boot the target OSs. It is noted that in the example of FIG. 2 the partitions are started and the target OSs loaded and executed only after the hypervisor was started on each core. However, it is not a requirement that all cores be started before launching a partition; as long as all cores assigned to a particular partition have been started with the hypervisor, then the partition can be started to boot the target OS on that partition. This is in contrast to the example of FIG. 2 where all three cores are started and the VMM is loaded on all cores before starting any of the partitions.

Continuing with the example of FIG. 2, Firestreak starts (224) partition 2 on core 2 and starts (228) partition 1 on cores 0 and 1. As part of partition startup, a component—in the example of FIG. 2 it is the Firestreak EFI app—is to initialize data structures necessary for virtualization. For instance, 'fake' ACPI (Advanced Configuration and Power Interface) tables can be created to present the desired CPU, and possibly other hardware resource, topology to the next boot target (e.g. the target OS for the partition, e.g. a Windows® or Linux OS). It is noted that in alternative embodiments, the hypervisor has already initialized these data structures, e.g. as part of the VMM init.

The Multiple APIC Description Table (MADT) is a particular ACPI table that can be used to enumerate the cores that are available on the system. For example, if the platform (referring to the computer system hardware) has exactly four cores, the MADT will point to four 'interrupt control structures', each describing one of the four cores on the system. While the true MADT table(s) contain a corresponding four entries, aspects presented herein create 'fake' MADT tables, one for each partition to indicate only the core(s) that are dedicated to that partition. In FIG. 2, the EFI app creates (226) fake ACPI table(s) for partition 2 that indicate existence of just core 2 for partition 2, and the EFI app creates (230) fake ACPI table(s) for partition 1 that indicate the existence of just cores 0 and 1 for partition 1. The Firestreak app (or the hypervisor as the case may be) can use the real MADT table to create this set of fake MADT tables since both Firestreak and the hypervisor have the ability to read the real MADT table.

Figure 3:
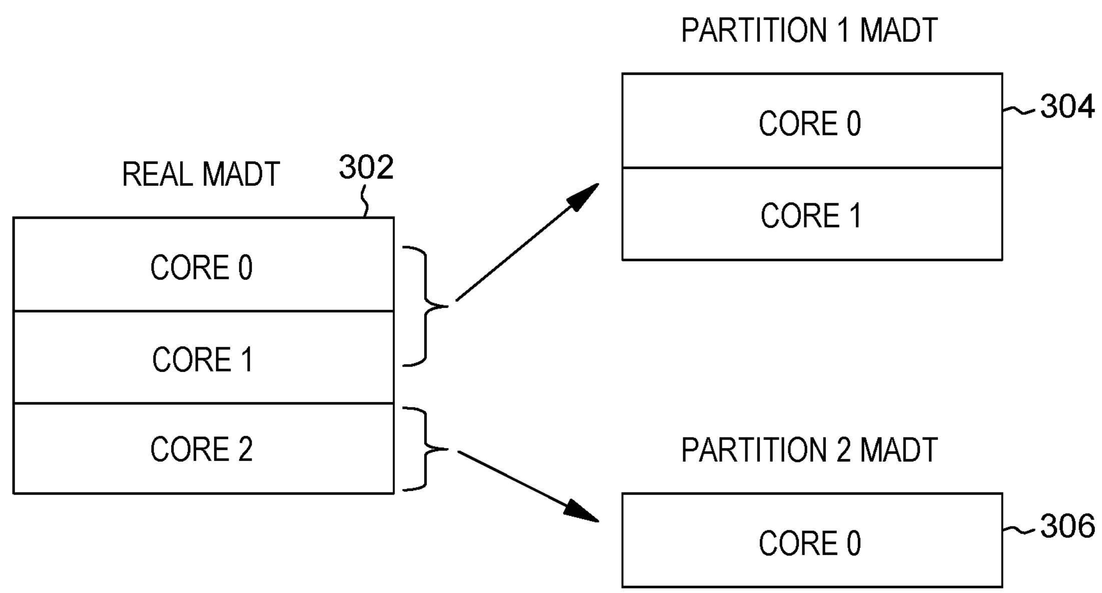
FIG. 3 depicts an example of spoofed Multiple APIC Description Tables for individual partitions, in accordance with aspects described herein.

FIG. 3 depicts an example of spoofed Multiple APIC Description Tables for individual partitions, in accordance with aspects described herein. The Real MADT 302 indicates cores 0, 1 and 2. The created MADT for partition 1 (table 304) indicates cores 0 and 1, and the created MADT for partition 2 (table 306) indicates core 2. The created MADTs 340, 306 will follow whatever the desired partitioning is for the cores on the system. In the example of FIG. 2, the Linux OS is to run in partition 1 on cores 0 and 1, and the Windows® OS is to run in partition 2 on core 2.

Continuing with the flow of FIG. 2, using the fake ACPI tables, each VMM instance of the partitions can continue with partition booting by updating the respective partition memory map and allocating interrupts. This is shown in FIG. 2 at 232 for partition 2 and 234 for partition 1.

As there are situations where a partition is dedicated two or more cores (such as the case with partition 1 in FIG. 2), and therefore the VMM is started and running on the two or more cores, configuration information as to the configuration of the cores, memory allotments, and any other desired dedication and/or availability of resources to the individual partitions can be passed or otherwise made accessible to the hypervisor instances at setup time. In embodiments, Firestreak dictates this information to the hypervisor instances. Such configuration information can be made available in any of various ways, for instance by providing a configuration file having configuration information that the Firestreak app and/or hypervisor reads. Alternatively, it could be hard-coded into the Firestreak application and/or hypervisor code if desired. As yet another alternative, the information could be received as input from a user via an EFI application (Firestreak or otherwise) or other application executing on the system or a remote system, for instance a system across a network (local area or wide area). In addition, any combination of one or more techniques, such as those above, could be used.

Because the hypervisor is running before the target OS is booted, the hypervisor can manipulate the relevant tables and other data structures to represent to the target OS which hardware is available to the OS. When/if the OS queries the system for, e.g., how many cores there are, which typically occurs at OS boot time, that is handled by the hypervisor and the OS will see the number of cores the 'fake' data structures indicate.

In these embodiments, then, the hypervisor, Firestreak, or a combination of the two, properly creates each target OS's expected state and ensures that the physical resources dedicated to one partition remain isolated from other partitions and vice versa.

Returning to FIG. 2, after the partitions are configured (after 232, 234), the partitions are ready to start the target OSs. The EFI application boots (236) Linux on partition 1 and boots (238) Windows® on partition 2. As noted previously, this can be accomplished by the EFI application manipulating the BootNext and/or BootOrder variables to include the paths to the target OS images, and the OSs will start as desired. The paths are passed to the already-running hypervisors. Consequently, Linux boots at 240 on each core of partition 2 and Windows® boots at 242 on the single core of partition 2.

In booting the OSs on the partitions, the hypervisor is to properly emulate and/or handle bootstrap operations of each target OS. For example, when booting a multi-core Linux partition as is the case in the example of FIG. 2, the hypervisor could, if necessary, emulate the INIT-SIPI protocol for multi-core initialization. If ACPI tables are setup correctly, and assuming the running OSs are not malicious, they should respect those ACPI tables and not attempt to circumvent their authority. In practice, non-malicious standard OSs like Linux and Windows® OS would not behave maliciously. In this case, allowing the OS to perform the INIT SIPI protocol should not cause a problem and therefore it may not be strictly necessarily to emulate that protocol.

Nonetheless, there may be some indications that could tip-off an OS that it is being lied to. There are different sources that an OS expects to indicate consistent information in terms of the number of processor cores, for example. ACPI is one such source. The CPUID instruction is another such source. CPUID can be invoked in such a way that it indicates how many cores there are on the system. If an OS was able to invoke this function, then the call functionality could be emulated by the hypervisor to provide a response that is consistent with what the OS was given at boot time of the OS. A third source of this information may be a UEFI function that queries for the number of cores in the system. The hypervisor could hook that call and present a false response to keep consistent with what is presented to the partition. Whether an inconsistency would be found by the OS is largely a function of the particular processing of the OS, but the hypervisor can be configured to handle situations that would require the hypervisor or other software to lie to the OS in order to maintain the configured resource isolation.

With respect to available EFI functions, UEFI is split between boot services and runtime services. Only certain functions are available after boot completes and transitions to runtime. In embodiments herein, the Firestreak EFI app runs while boot services is available (before boot services is disabled), allowing, for instance, manipulating the boot order variables as desired. It is noted in this regard that while these and other variables may be changed by a normal (privileged) user application after boot, the variable change would not take effect until the next boot. Such attempts could, if desired, be addressed by configuring a hook of the EFI that causes a desired response to be provided to the calling OS, for instance to lie to the OS about configured EFI parameters and/or provide false responses to the OS's (or application(s) running therein) attempts to manipulate EFI parameters. Further, EFI can be setup not to expose certain information/services to running OSs (i.e. when EFI is in the runtime mode when OSs execute). Consequently, in some embodiments, specific EFI boot time and runtime services could be disabled before, during, or shortly after booting the target OSs, to help maintain security when the OSs are running.

Ultimately, what is to be hooked in terms of traps from the OS to the hypervisor can depend on the system capabilities in terms of what is and is not locked down for the OSs.

While the hypervisor is heavily involved in setting up the hardware to create the isolated silos, it may be desired that the hypervisor itself does not execute unless certain, defined situations are encountered. Ideally, the hypervisor executes as little as possible after booting the target OSs, and in many cases it may be practically achievable for the hypervisor not execute again until the computer system is rebooted. A goal therefore can be to avoid any further execution by the hypervisor; it sets up the hardware, calls into the targets, and does not execute again. However, if desired, the hypervisor can be made ready to commence execution only to handle defined 'edge cases', for instance in case one of the executing OSs happens to attempt something that reaches out of its silo. The hypervisor could therefore be configured to address those situations but refrain from executing (yield execution on the core(s) in favor of OS execution) unless and until such a situation exists.

The hypervisor can therefore be minimal in size, non-intrusive, and only execute (after target OS boot) on edge conditions. The hypervisor's primary role is clearly to bootstrap the OSs such that multiple OSs are able to coexist on CPUs without any ongoing coordination or execution of the hypervisor. In other words, once the environment is setup as described herein with reference to FIG. 2, the OSs can execute on their own without any assistance (e.g. scheduling) by the hypervisor.

An edge case addressed above is an attempt by an OS to request an indication of resources—cores, memory, etc.—during execution. A related edge case is an attempt by an OS to 'touch' another resource that is not dedicated to the OS, or more particularly to the partition in which the OS executes. While it would be atypical for an OS to perform such actions, it may be possible if not otherwise locked down. The hypervisor can be configured to handle these cases if they arise. The hypervisor could, for instance, hook the subject function and properly handle the request, for instance by returning adjusted information back to the OS. In some examples, the hypervisor presents the OS with a false or incomplete representation of the resources (e.g. cores, memory, etc.) actually existent on the computer system, i.e. presents just the resources that are dedicated to the particular partition.

Another type of edge case is OS actions that always cause a trap to the hypervisor. The hypervisor can be configured to handle those traps. However, whether any such traps occur is largely a function of the activity of the OS and what it is designed to do. Custom OSs, for instance, may include code that rarely or never causes any traps to the hypervisor. Another example edge case is when malware attempts to execute outside of its footprint, at which point this can be detected and actions taken, for instance to kill or restart the executing OS.

Aspects described herein differ from conventional practices of running multiple OSs on a computer system with partitioning. In one conventional approach, a VM running an OS is started and the hypervisor at any given time hands core(s) to the OS for a scheduled execution period, which cores are then taken back and scheduled to another OS of a different VM. The hypervisor is active throughout the run-time of the system because it performs extensive scheduling and management of the cores. Typically, there is no particularity in what specific core(s) is/are given to a VM for a scheduled time slice; the focus is on the number of cores the VM is to receive rather than a dedication of particular cores to the individual VM. Consequently, a particular core may have various different VMs scheduled on it during different time slices across a duration of time that the computer system is booted. Even in cases where a conventional hypervisor is able to dedicate specific core(s) to specific guests, this is still reliant on very resource-heavy hypervisor services during runtime, requiring a scheduler for instance.

Partition isolation and hardware dedication can extend to any desired hardware resources, not just cores and memory. For instance, in cases where two OSs may not use a common network interface controller (NIC), then two such NICs are to be installed in the system and the hypervisor will setup the environment such that neither OS knows about the other's NIC.

Figure 4:
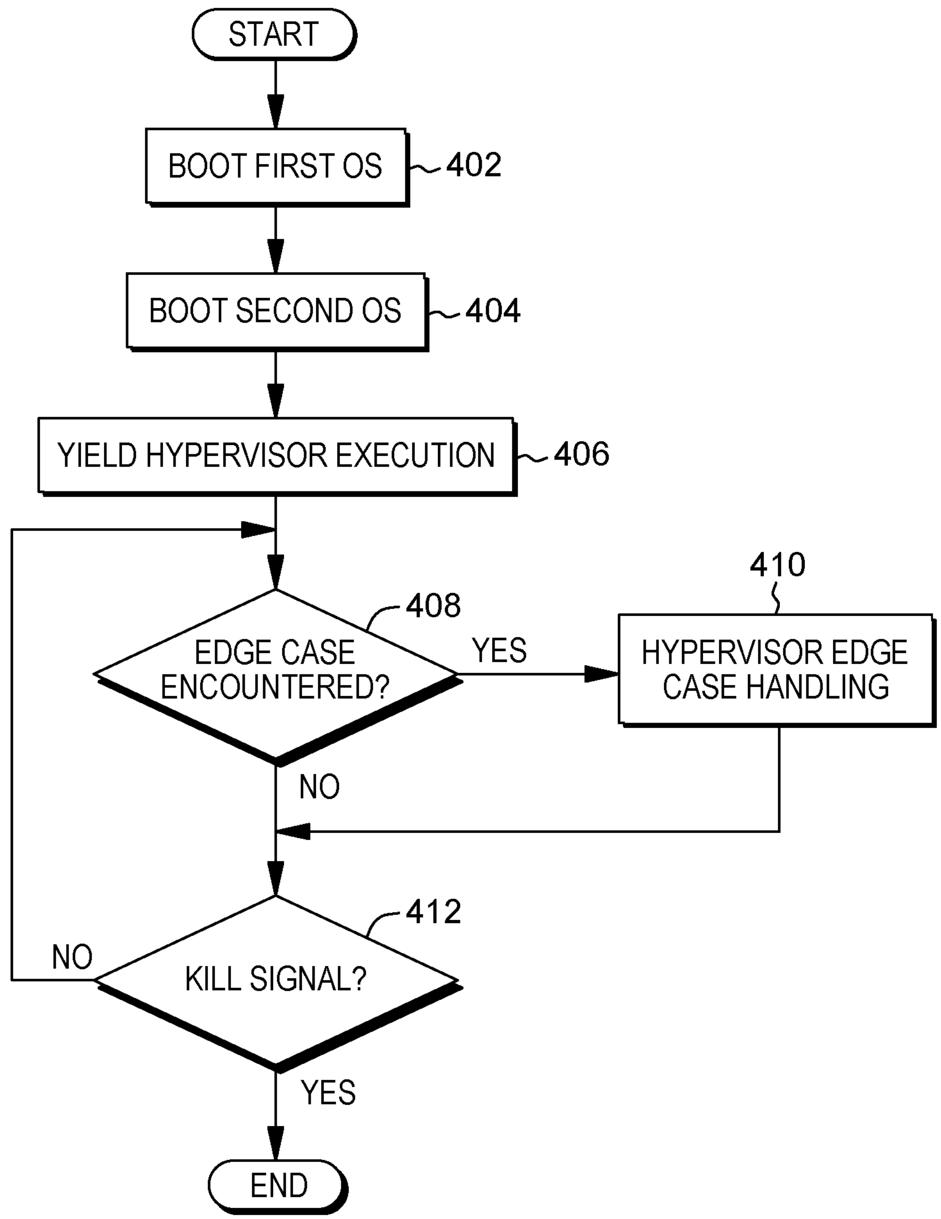
FIG. 4 depicts an example method for processor core isolation for execution of multiple operating systems on a multicore computer system, in accordance with aspects described herein.

FIG. 4 depicts an example method for processor core isolation for execution of multiple operating systems on a multicore computer system, in accordance with aspects described herein. In some examples, the process is performed by a computer system, particularly software executing thereon, and more particularly a firmware interface application (e.g. EFI application), hypervisor, or a combination of both.

The process includes booting (402) a first operating system on a computer system. The computer system can include a plurality of processor cores (the "full set" of cores of the system) across one or more physical central processing units (CPUs) of the computer system. Booting the first operating system can boot the first operating system on a first subset of the plurality of processor cores, i.e. a first proper subset of the full set of cores. The first subset includes one or more processor cores. The booting of the first operating system can include indicating to the first operating system, during bootstrapping thereof, that the computer system includes only the first subset of processor core(s), and that the computer system includes only the first subset of processor core(s) for execution of the first operating system.

In some examples, the indicating to the first operating system that the computer system includes only the first subset of processor core(s) for execution of the first operating system is in response to a request by the first operating system for an indication of the processor cores existing on the computer system. Booting the first operating system can include hooking a unified extensible firmware interface (UEFI) function invoked by the first operating system to make this request. The indicating to the first operating system that the computer system includes only the first subset of processor core(s) for execution of the first operating system can be performed in response to the hooking.

The method of FIG. 4 also includes booting (404) a second operating system, that is different from the first operating system, on a second subset of the plurality of processor cores. The second subset also includes one or more processor cores. The first subset of processor core(s) and second subset of processing core(s) are mutually exclusive subsets of the plurality of processor cores. In other words, the two operating systems are booted and run on different cores, and there is no sharing of the cores as between the two operating systems when booted and running, and that remains true while the computer system remains booted.

A first processor core of a physical CPU of the one or more physical CPUs is included in the first subset and a second processor core of the physical CPU is included in the second subset. This is to say that two different cores of one of the physical CPUs of the system have booted thereon, and run, different operating systems. Furthermore, the first and second operating systems can execute concurrently on the computer system, meaning they can execute simultaneously, and each of the first and second operating systems can execute on only its respective subset of processor core(s).

Similar to booting the first operating system, booting the second can include indicating to the second operating system, during bootstrapping thereof, that the computer system includes only the second subset of processor core(s), and that the computer system includes only the second subset of processor core(s) for execution of the second operating system.

Based on having booted the first and second operating systems on the computer system, the method of FIG. 4 proceeds by yielding (406) hypervisor execution. Yielding in this sense means that the hypervisor has yielded the CPU execution to the OSs. In some examples while in this state hypervisor code is not executing on the CPUs. The hypervisor remains in that state while and until an edge case is encountered. The method enters a loop that determines (408) whether an edge case was encountered. Example such edge cases include, but are not limited to: (i) an operating system executing on the computer system attempting to control or execute on a processor core not part of a subset of one or more processor cores on which the operating system is booted, (ii) an operating system executing on the computer system making an inquiry about hardware it is to control or execute on, and (iii) a trap to the hypervisor.

If at 408 it is determined that an edge case is encountered (408, Y), then the process proceeds with the hypervisor handling (410) the edge case. The hypervisor will execute as needed to handle the edge case and provide a response which resumes OS execution (and hypervisor non-execution). After edge case handling, or if no edge case determined at 408, the process determines (412) whether a kill signal is received, for instance a signal to kill the process, kill the hypervisor, shut down the computer system, etc. If no kill signal is detected (412, N), the process loops back to 408, otherwise (412, N) the process ends.

The computer system can therefore include a hypervisor initially booted on each processor core of the plurality of processor cores prior to booting the first operating system and the second operating system. The hypervisor can initiate the booting of the first operating system and the booting of the second operating system.

In this manner, the first and second operating systems can execute on the first subset of processor core(s) and second subset of processor core(s), respectively, absent the execution of the first operating system and second operating system being scheduled by the hypervisor. In other words, there may be no scheduling of the execution of the operating systems on the respective cores dedicated to them. In some examples, the hypervisor includes a scheduler but it is disabled or, at the very least, is not running, by virtue of the fact that the hypervisor is not executing. Alternatively, the hypervisor may be provided without a scheduler that is configured to perform ongoing scheduling of execution of the first and second operating systems on their respective subsets of processor cores.

It is noted that any number of OSs can be booted along with the first and second OSs that are the subject of FIG. 4. Thus, an example processes can further include booting one or more additional operating systems on one or more additional subsets of the plurality of processor cores, each additional subset comprising one or more processor cores. For each additional operating system of the one or more additional operating systems, the additional subset of processor core(s) on which the additional operating system is booted can be mutually exclusive of each additional subset of the one or more additional subsets and mutually exclusive of the first and second subsets of processor core(s). Additionally, the first, second, and one or more additional operating systems can execute concurrently/simultaneously on the computer system and each of the first, second, and one or more additional operating system can execute on only its respective subset of processor core(s).

In some examples, the first operating system is configured to take control of the Basic Input/Output System (BIOS) of the computer system, while the second operating system (and any other operating systems to execute on the system) is/are configured not to attempt to take control of the BIOS.

Although various examples are provided, variations are possible without departing from a spirit of the claimed aspects.

Figure 5:
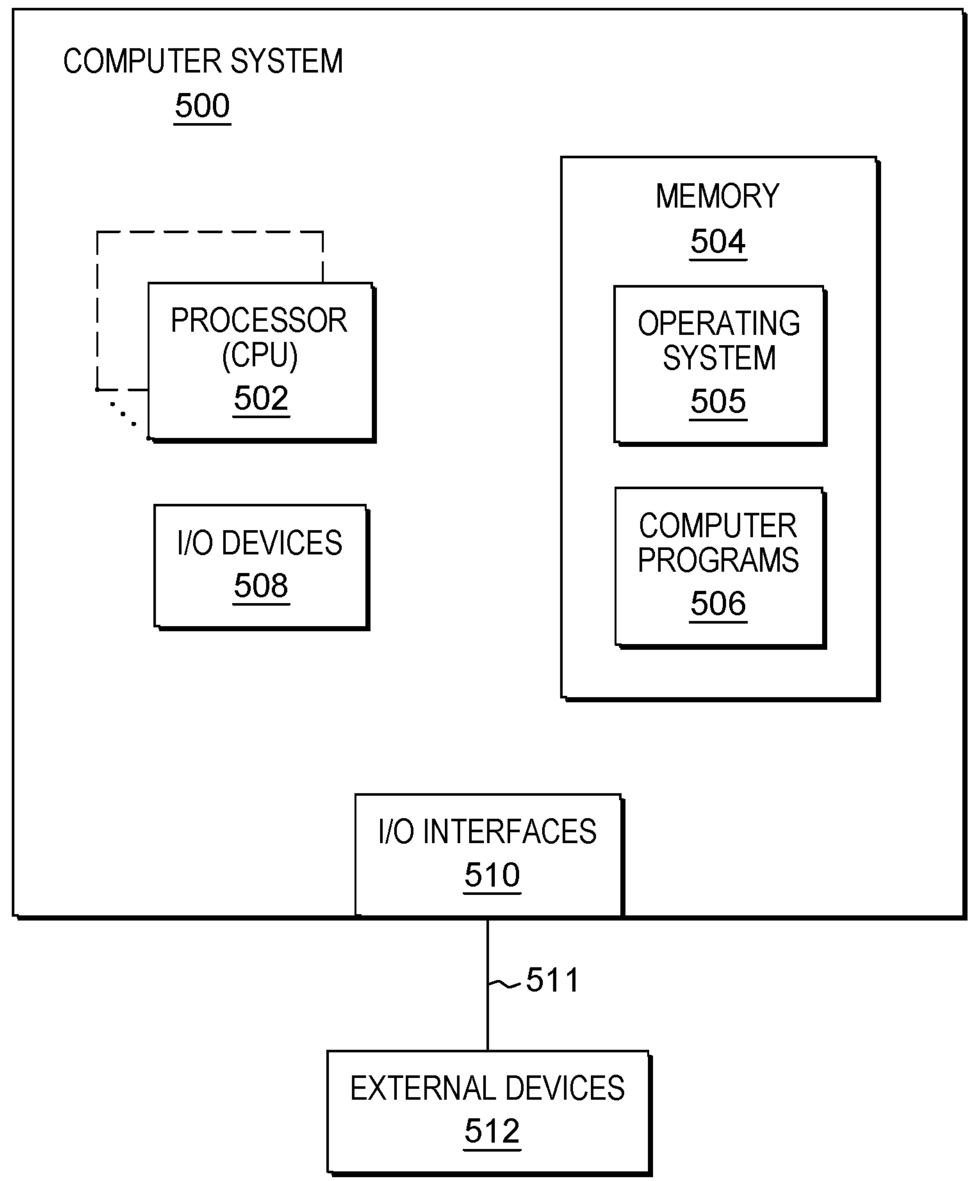
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA), as an example.

FIG. 5 shows a computer system 500 in communication with external device(s) 512. Computer system 500 includes one or more physical processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store one or more operating system(s) 505 and other computer program(s) 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects described herein may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

booting a hypervisor on each processor core of a plurality of processor cores across one or more physical central processing units (CPUs) of a computer system, and enabling virtualization on the computer system for the hypervisor to launch guest virtual machines for execution on the computer system;

booting a first operating system on the computer system as a first guest of the hypervisor, wherein booting the first operating system boots the first operating system on a first subset of the plurality of processor cores, the first subset comprising one or more processor cores; and booting, as a second guest of the hypervisor, a second operating system, different from the first operating system, on a second subset of the plurality of processor cores, the second subset comprising one or more processor cores, wherein the first subset and second subset are mutually exclusive subsets of the plurality of processor cores, wherein a first processor core of a physical CPU of the one or more physical CPUs is included in the first subset and a second processor core of the physical CPU is included in the second subset, wherein the first and second operating systems execute concurrently on the computer system, and each of the first and second operating systems executes on only its respective subset of processor core(s), and wherein the first and second operating systems execute concurrently on the first subset of processor core(s) and second subset of processor core(s), respectively, absent scheduling the execution of the first operating system on the first subset of processor core(s) and the execution of the second operating system on the second subset of processor core(s);

wherein based on the first and second operating systems booting on the computer system, the method further comprises the hypervisor yielding execution, wherein the hypervisor is configured to, after the yielding execution, commence execution in the following occurrence; an operating system executing on the computer system attempts to control or execute on a processor core not part of a subset of one or more processor cores on which the operating system is booted.

2. The method of claim 1, wherein the hypervisor is initially booted on each processor core of the plurality of processor cores prior to booting the first operating system and the second operating system, and the hypervisor initiates the booting of the first operating system and the booting of the second operating system.

3. The method of claim 1, wherein the hypervisor is provided without a scheduler configured to perform ongoing scheduling of execution of the first and second operating systems on their respective subsets of processor cores.

4. The method of claim 1, wherein the hypervisor is configured to, after the yielding execution, commence execution in one or more of the following occurrences:

(i) an operating system executing on the computer system makes an inquiry about hardware it is to control or execute on; and (ii) a trap to the hypervisor is made.

5. The method of claim 1, wherein the booting the first operating system comprises indicating to the first operating system, during bootstrapping thereof, that the computer system includes only the first subset of processor core(s) for execution of the first operating system, and wherein the booting the second operating system comprises indicating to the second operating system, during bootstrapping thereof, that the computer system includes only the second subset of processor core(s) for execution of the second operating system.

6. The method of claim 5, wherein the indicating to the first operating system is in response to a request by the first operating system for an indication of the processor cores existing on the computer system.

7. The method of claim 6, wherein the booting the first operating system comprises hooking a unified extensible firmware interface (UEFI) function invoked by the first operating system to make the request, and performing the indicating to the first operating system in response to the hooking.

8. The method of claim 1, further comprising booting one or more additional operating systems on one or more additional subsets of the plurality of processor cores, each additional subset comprising one or more processor cores, wherein:

for each additional operating system of the one or more additional operating systems, the additional subset of processor core(s) on which the additional operating system is booted is mutually exclusive of each additional subset of the one or more additional subsets and mutually exclusive of the first and second subsets of processor core(s); and the first, second, and one or more additional operating systems execute concurrently on the computer system and each of the first, second, and one or more additional operating system executes on only its respective subset of processor core(s).

9. The method of claim 1, wherein the first operating system is configured to execute natively on the computer system, invoking instructions calling to computer system firmware to acquire system information, and wherein the second operating system is configured to execute with awareness of the hypervisor, invoking instructions calling to the hypervisor to acquire system information.

10. A computer program product comprising:

a non-transitory computer readable storage medium storing instructions for execution to perform a method, the method comprising:

booting a hypervisor on each processor core of a plurality of processor cores across one or more physical central processing units (CPUs) of a computer system, and enabling virtualization on the computer system for the hypervisor to launch guest virtual machines for execution on the computer system;

booting a first operating system on the computer system as a first guest of the hypervisor, wherein booting the first operating system boots the first operating system on a first subset of the plurality of processor cores, the first subset comprising one or more processor cores; and booting, as a second guest of the hypervisor, a second operating system, different from the first operating system, on a second subset of the plurality of processor cores, the second subset comprising one or more processor cores, wherein the first subset and second subset are mutually exclusive subsets of the plurality of processor cores, wherein a first processor core of a physical CPU of the one or more physical CPUs is included in the first subset and a second processor core of the physical CPU is included in the second subset, wherein the first and second operating systems execute concurrently on the computer system, and each of the first and second operating systems executes on only its respective subset of processor core(s), and wherein the first and second operating systems execute concurrently on the first subset of processor core(s) and second subset of processor core(s), respectively, absent scheduling the execution of the first operating system on the first subset of processor core(s) and the execution of the second operating system on the second subset of processor core(s), wherein based on the first and second operating systems booting on the computer system, the method further comprises the hypervisor yielding execution, wherein the hypervisor is configured to after the yielding execution, commence execution in the following occurrence: an operating system executing on the computer system attempts to control or execute on a processor core not part of a subset of one or more processor cores on which the operating system is booted.

11. The computer program product of claim 10, wherein the hypervisor is initially booted on each processor core of the plurality of processor cores prior to booting the first operating system and the second operating system, and the hypervisor initiates the booting of the first operating system and the booting of the second operating system.

12. The computer program product of claim 11, wherein based on the first and second operating systems booting on the computer system, the method further comprises the hypervisor yielding execution, wherein the hypervisor is configured to, after the yielding execution, commence execution in one or more of the following occurrences:

(i) an operating system executing on the computer system makes an inquiry about hardware it is to control or execute on; and (ii) a trap to the hypervisor is made.

13. The computer program product of claim 10, wherein the booting the first operating system comprises indicating to the first operating system, during bootstrapping thereof, that the computer system includes only the first subset of processor core(s) for execution of the first operating system, and wherein the booting the second operating system comprises indicating to the second operating system, during bootstrapping thereof, that the computer system includes only the second subset of processor core(s) for execution of the second operating system.

14. The computer program product of claim 13, wherein the indicating to the first operating system is in response to a request by the first operating system for an indication of the processor cores existing on the computer system, and wherein the booting the first operating system comprises hooking a unified extensible firmware interface (UEFI) function invoked by the first operating system to make the request, and performing the indicating to the first operating system in response to the hooking.

15. The computer program product of claim 10, wherein the method further comprises booting one or more additional operating systems on one or more additional subsets of the plurality of processor cores, each additional subset comprising one or more processor cores, wherein:

for each additional operating system of the one or more additional operating systems, the additional subset of processor core(s) on which the additional operating system is booted is mutually exclusive of each additional subset of the one or more additional subsets and mutually exclusive of the first and second subsets of processor core(s); and the first, second, and one or more additional operating systems execute concurrently on the computer system and each of the first, second, and one or more additional operating system executes on only its respective subset of processor core(s).

16. A computer system comprising:

a memory; and a processing circuit in communication with the memory, wherein the computer system, in association with the processing circuit and memory, is configured to perform a method comprising:

booting a hypervisor on each processor core of a plurality of processor cores across one or more physical central processing units (CPUs) of a computer system, and enabling virtualization on the computer system for the hypervisor to launch guest virtual machines for execution on the computer system;

booting a first operating system on the computer system as a first guest of the hypervisor, wherein booting the first operating system boots the first operating system on a first subset of the plurality of processor cores, the first subset comprising one or more processor cores; and booting, as a second guest of the hypervisor, a second operating system, different from the first operating system, on a second subset of the plurality of processor cores, the second subset comprising one or more processor cores, wherein the first subset and second subset are mutually exclusive subsets of the plurality of processor cores, wherein a first processor core of a physical CPU of the one or more physical CPUs is included in the first subset and a second processor core of the physical CPU is included in the second subset, wherein the first and second operating systems execute concurrently on the computer system, and each of the first and second operating systems executes on only its respective subset of processor core(s), and wherein the first and second operating systems execute concurrently on the first subset of processor core(s) and second subset of processor core(s), respectively, absent scheduling the execution of the first operating system on the first subset of processor core(s) and the execution of the second operating system on the second subset of processor core(s), wherein based on the first and second operating systems booting on the computer system, the method further comprises the hypervisor yielding execution, wherein after the yielding execution, the hypervisor is configured to, commence execution in the following occurrence: an operating system executing on the computer system attempts to control or execute on a processor core not part of a subset of one or more processor cores on which the operating system is booted.

17. The computer system of claim 16, wherein the hypervisor is initially booted on each processor core of the plurality of processor cores prior to booting the first operating system and the second operating system, and the hypervisor initiates the booting of the first operating system and the booting of the second operating system.

18. The computer system of claim 17, wherein based on the first and second operating systems booting on the computer system, the method further comprises the hypervisor yielding execution, wherein after the yielding execution, the hypervisor is configured to, commence execution in one or more of the following occurrences:

(i) an operating system executing on the computer system makes an inquiry about hardware it is to control or execute on; and (ii) a trap to the hypervisor is made.

19. The computer system of claim 16, wherein the booting the first operating system comprises indicating to the first operating system, during bootstrapping thereof, that the computer system includes only the first subset of processor core(s) for execution of the first operating system, and wherein the booting the second operating system comprises indicating to the second operating system, during bootstrapping thereof, that the computer system includes only the second subset of processor core(s) for execution of the second operating system.

20. The computer system of claim 19, wherein the indicating to the first operating system is in response to a request by the first operating system for an indication of the processor cores existing on the computer system, and wherein the booting the first operating system comprises hooking a unified extensible firmware interface (UEFI) function invoked by the first operating system to make the request, and performing the indicating to the first operating system in response to the hooking.

21. The computer system of claim 16, wherein the method further comprises booting one or more additional operating systems on one or more additional subsets of the plurality of processor cores, each additional subset comprising one or more processor cores, wherein:

for each additional operating system of the one or more additional operating systems, the additional subset of processor core(s) on which the additional operating system is booted is mutually exclusive of each additional subset of the one or more additional subsets and mutually exclusive of the first and second subsets of processor core(s); and the first, second, and one or more additional operating systems execute concurrently on the computer system and each of the first, second, and one or more additional operating system executes on only its respective subset of processor core(s).

* * * * *